United States Patent
McCulley et al.

(10) Patent No.: US 6,363,474 B1
(45) Date of Patent: Mar. 26, 2002

(54) PROCESS SWITCHING REGISTER REPLICATION IN A DATA PROCESSING SYSTEM

(75) Inventors: Lowell McCulley; Charles Ryan, both of Phoenix; Ronald Yoder, Mesa, all of AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 0 days.

(21) Appl. No.: 09/345,229

(22) Filed: Jun. 30, 1999

(51) Int. Cl.[7] .................. G06F 12/02; G06F 13/16; G06F 9/22; G06F 9/30
(52) U.S. Cl. ............ 712/202; 712/228; 712/227; 712/225; 712/248; 712/216; 711/132
(58) Field of Search ................ 711/132, 145, 711/153, 155; 712/200, 228, 201, 41, 42, 219, 202, 216, 217, 218, 247, 225, 248, 227, 231, 234, 241, 242, 243, 245; 710/260, 267, 19, 14; 345/442; 714/16, 21, 49, 764; 707/202

(56) References Cited

U.S. PATENT DOCUMENTS 5,241,654 A * 8/1993 Kai et al. .................... 345/442
5,241,679 A * 8/1993 Nakagawa et al. ......... 710/260

* cited by examiner

Primary Examiner—Daniel H. Pan
(74) Attorney, Agent, or Firm—J. S. Solakin; J. H. Phillips

(57) ABSTRACT

In a data processing system that includes a safe store buffer containing valid copies of all registers, processor transitions from a higher security routine to a lower security routine can be performed in fewer cycles by utilizing a plurality of sets of registers maintained in a round-robin system. Whenever a transition is made to a higher security environment, a switch is made to a different set of registers. Then, when a transition is made back to the lower security environment, a switch is made back to the previous set of registers. Writes to memory copies of registers are detected, and only those registers whose memory copies have been modified are restored from the memory copy.

18 Claims, 12 Drawing Sheets

PROCESS SWITCHING REGISTER REPLICATION IN A DATA PROCESSING SYSTEM

CROSS REFERENCE TO RELATED APPLICATION

This application is related to our patent application entitled "FAST DOMAIN SWITCH AND ERROR RECOVERY IN A SECURE CPU ARCHITECTURE, filed Dec. 19, 1997, with Ser. No. 08/994,476, and assigned to the assignee hereof now U.S. Pat. No. 6,014,757.

FIELD OF THE INVENTION

The present invention generally relates to data processing systems, and more specifically to duplicating registers in order to minimize register reloading during a context switch.

BACKGROUND OF THE INVENTION

Computer processors typically include in their instruction sets instructions for changing processor state. For example, many computer architectures include instructions to change from user mode to supervisory mode, and back. Indeed, without this sort of instruction, it is highly problematic whether architecture can do an adequate job in protecting one user from another, or the operating system from users.

In a modem operating system (OS), there are well-defined tasks that must be accomplished when an operating system dispatches user tasks and programs to execute, and when the operating system receives control back after such execution. Some of these tasks including loading and storing general-purpose registers and segment registers.

Some architectures, especially Reduced Instruction Set Computer (RISC) architectures, utilize long, often repeated, sequences of code to load and store these general purpose and segment registers. As this function is repeated whenever control is transferred to or received from a user program, this approach of utilizing long, often repeated, sequences of code can be quite costly. For that reason, specialized instructions have been added to some architectures to expedite this entire process. For example, the GCOS® 8 architecture, owned by the assignee of this invention, includes a CLIMB instruction utilized to change from supervisory mode to user mode, and back. The CLIMB family of instructions performs all actions necessary to change from supervisory mode to user mode, and back in a single instruction.

Unfortunately, execution of such complex state changing instructions as the CLIMB can be quite expensive in terms of processor cycles required for execution. This is especially important in high volume transaction environments where it is necessary to switch back and forth, to and from supervisory mode to user mode quite often. It would thus be extremely useful if the number of computer cycles could be reduced when executing a complex state change instruction.

One place where a significant amount of time is spent during execution of complex state change instructions is in loading and restoring all of the registers required. This is typically done in a serial fashion, loading or storing one register at a time. This can be quite expensive in terms of processor cycles. It would thus be advantageous for a computer architecture to provide a mechanism for eliminating at least some register loading and/or storing.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

Figure 1:
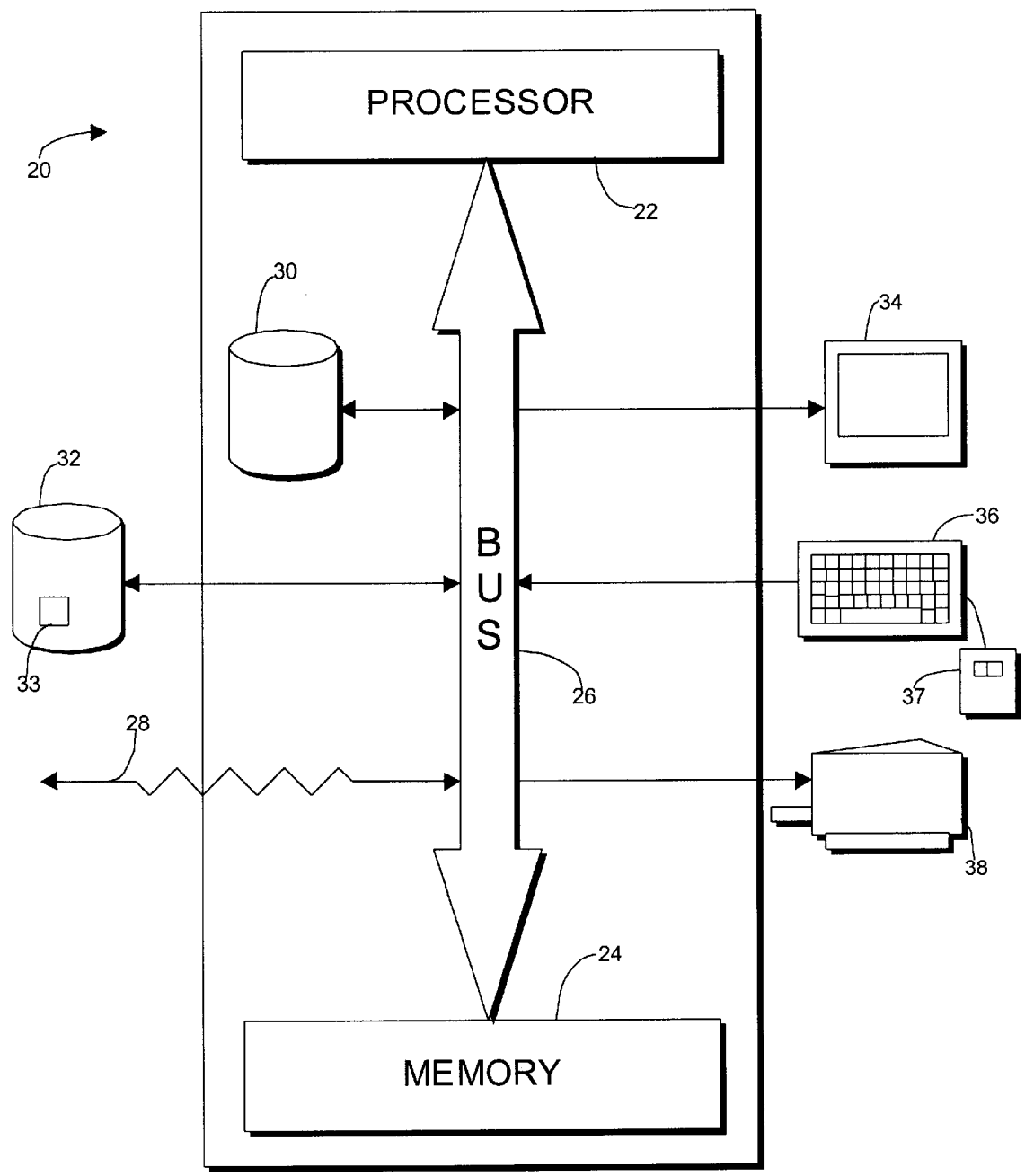
FIG. 1 is a block diagram illustrating a General Purpose Computer, in accordance with the present invention.

In a data processing system that includes a safe store buffer containing valid copies of all registers, processor transitions from a higher security routine to a lower security routine can be performed in fewer cycles by utilizing a plurality of sets of registers maintained in a round-robin system. Whenever a transition is made to a higher security environment, a switch is made to a different set of registers. Then, when a transition is made back to the lower security environment, a switch is made back to the previous set of registers. Writes to memory copies of registers are detected, and only those registers whose memory copies have been modified are restored from the memory copy.

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

The GCOS® 8 operating system supports a CLIMB family of instructions to change the programming environment. The ICLIMB instruction is utilized to transfer control from a less secure environment, such as a user program, to a more secure environment, such as the operating system. The OCLIMB instruction operates in reverse, transferring control back to the less secure environment. Interrupts are typically serviced by a variant of the ICLIMB instruction.

The ICLIMB instruction first adjusts a Safe Store Stack Register (SSR) to point at a new Safe Store Stack Frame 304. The instruction then saves part or all of the current programming environment from a Safe Store Buffer 286 into that Safe Store Stack frame 304. In the preferred embodiment, a Safe Store Stack Frame 304 may be 16, 24, 64, or 80 words in length. The Safe Store Stack Frame 304 is then pushed out to memory.

When the higher security environment returns, an OCLIMB is executed in order to restore the previous environment. In the prior art, execution of this instruction both the Safe Store Buffer 286 and the corresponding registers are loaded from the current Safe Store Stack Frame 304. The Safe Store Stack Register (SSR) is adjusted to address the previous Safe Store Stack Frame 304, and control is transferred to the return address.

The present invention minimizes the process of restoring registers from a Safe Store Stack Frame 304 by maintaining multiple duplicate register sets, with each register set corresponding to a single Safe Store Stack Frame 304. When an ICLIMB instruction is executed to CLIMB to a more secure or more privileged environment, the current registers are pushed out to a Safe Store Stack Frame 304 in memory. A new set of registers is then selected for use while in this more secure or more privileged environment. When an OCLIMB instruction is executed that returns to a less secure or less privileged environment, the register set corresponding to the previous environment and corresponding Safe Store Stack Frame 304 is selected. The registers in this selected register set will be used until the next ICLIMB or OCLIMB instruction. This eliminates the need to restore registers from a Safe Store Stack Frame 304 when returning to a previous environment utilizing an OCLIMB instruction. This can significantly reduce the number of cycles that such an instruction takes to execute.

Several additions to the above are also within the concept of the present invention. A test is made whether a store is made into a Safe Store Stack Frame 304 in memory containing register contents to restore a previous environment. If a store is detected, the saved set of registers no longer corresponds to the contents of the Safe Store Stack Frame 304. The register set can be invalidated in its entirety, necessitating reloading from the Safe Store Stack Frame 304, or in an alternate embodiment, the registers corresponding to the modifications in the Safe Store Stack Frame 304 are invalidated. Detecting such modifications can take a number of forms. For example, address comparators can be utilized to detect and latch Safe Store Stack Frame 304 writes. Alternatively, cache entries containing the Safe Store Stack Frames 304 can be marked or colored. Additionally, the pushing of a Safe Store Stack Frame 304 to memory in response to an ICLIMB instruction can be implemented as a background operation, stealing unused memory cycles, since the copy of registers being saved is not used in the new environment.

FIG. 1 is a block diagram illustrating a General Purpose Computer 20. The General Purpose Computer 20 has a Computer Processor 22, and Memory 24, connected by a Bus 26. Memory 24 is a relatively high speed machine readable medium and includes Volatile Memories such as DRAM, and SRAM, and Non-Volatile Memories such as, ROM, FLASH, EPROM, EEPROM, and bubble memory. Also connected to the Bus are Secondary Storage 30, External Storage 32, output devices such as a monitor 34, input devices such as a keyboard (with mouse) 36, and printers 38. Secondary Storage 30 includes machine-readable media such as hard disk drives, magnetic drum, and bubble memory. External Storage 32 includes machine-readable media such as floppy disks, removable hard drives, magnetic tape, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software such as test programs, operating systems, and user programs can be stored in a Computer Software Storage Medium, such as memory 24, Secondary Storage 30, and External Storage 32. Executable versions of computer software 33, can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution.

Figure 2:
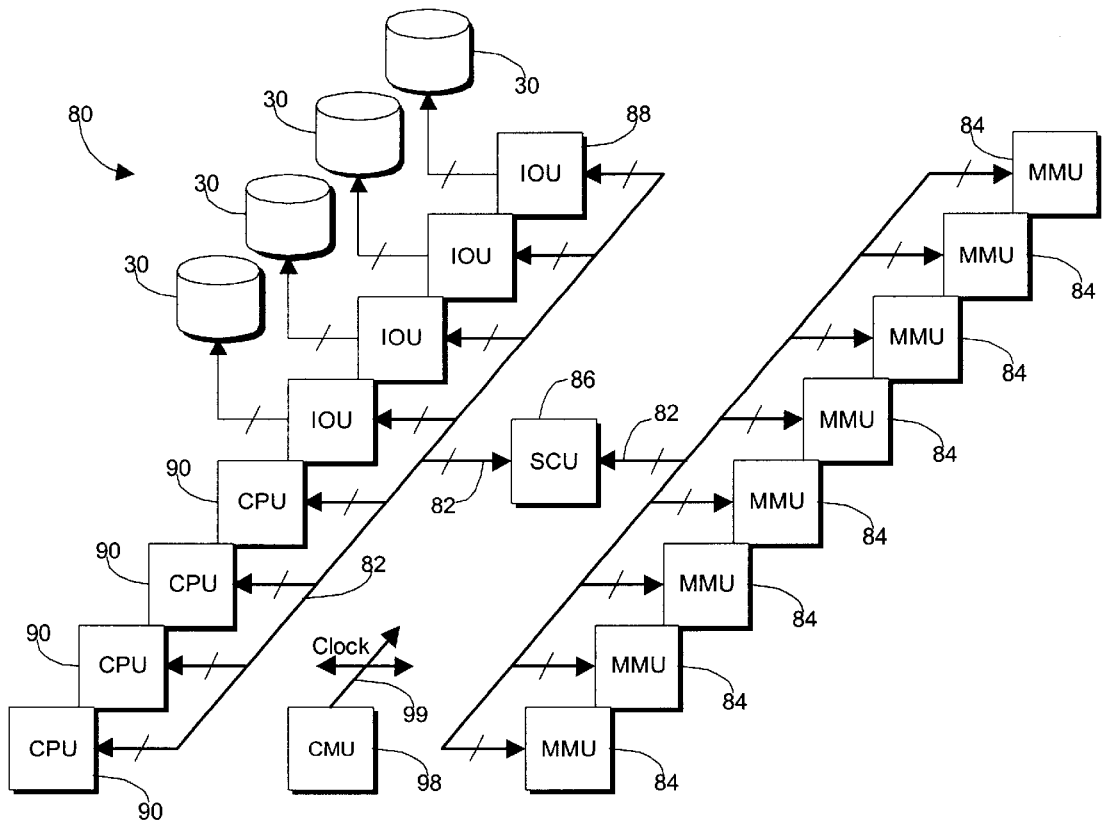
FIG. 2 is a block diagram of a more detailed view of a multiprocessor data processing system, in accordance with a preferred embodiment of the present invention.

FIG. 2 is a block diagram of a more detailed view of a multiprocessor data processing system, in accordance with the present invention. The multiprocessor data processing system 80 comprises a plurality of modules coupled together via an intramodule bus 82 controlled by a storage control unit 86. In the preferred embodiment, each such module 84, 88, 90 is contained on a single board, with the boards connecting into a backplane. The backplane includes the intramodule bus 82. In the representative data processing system 80 shown in FIG. 2, sixteen modules are shown. The system includes four (4) processor ("CPU") modules 90, four (4) Input/Output ("IOU") modules 88, and eight (8) memory ("MMU") modules 84. Each of the four Input/Output ("IOU") modules 88 is shown coupled to secondary storage 30. This is representative of the function of such IOU modules 88. Each IOU module 88 will typically contain a plurality of IOU processors (not shown). Each of the eight memory modules 84 contains memory 24 and a memory controller (not shown). This memory 24 is typically Dynamic Random Access Memory (DRAM). Large quantities of such memory 24 are typically supported. Also shown in FIG. 2 is a Clock Management Unit 98, which supplies a standard clock signal 99 to the remainder of the system 80. As clock signals are ubiquitous in digital computer architectures, the clock signal 99 will not be shown further herein except where relevant.

Figure 3:
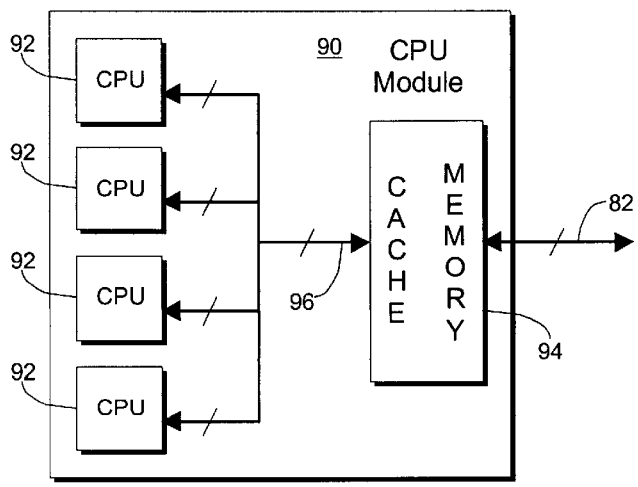
FIG. 3 is a block diagram illustrating a processor (CPU) module as shown in FIG. 2.

FIG. 3 is a block diagram illustrating a processor (CPU) module 90 as shown in FIG. 2. The CPU module 90 contains a plurality of processors (CPU) 92 and a cache memory system 94. In the preferred embodiment, each processor (CPU) module 90 contains up to four (4) processors (CPU) 92. The processors 92 and the cache memory system 94 are coupled together and communicate over an intraprocessor bus 96.

The cache memory system 94 is shared among the processors 92 on the CPU module 90 and maintains cache copies of data loaded into those processors 92. The cache memory system 94 is considered here a Level 2 cache and is coupled to and communicates with the storage control system (SCU) 88 over the intramodule bus 82 in order to maintain cache coherency between Level 1 (L1) cache memories 94 on each of the processor modules 90, as well as between cache memories 256 in each of the processors 92, and on the IOU modules 88. The SCU 88 also maintains coherency between the various cache memories 94, 256, and the typically slower speed memory in the MMU modules 84. In the preferred embodiment, a single block of memory will be owned by a single cache or memory at potentially each level in the memory hierarchy. Thus, a given memory block may be owned by one Level 1 (L1) cache 256, by one Level 2 (L2) cache 94, and by one MMU 84.

Figure 4:
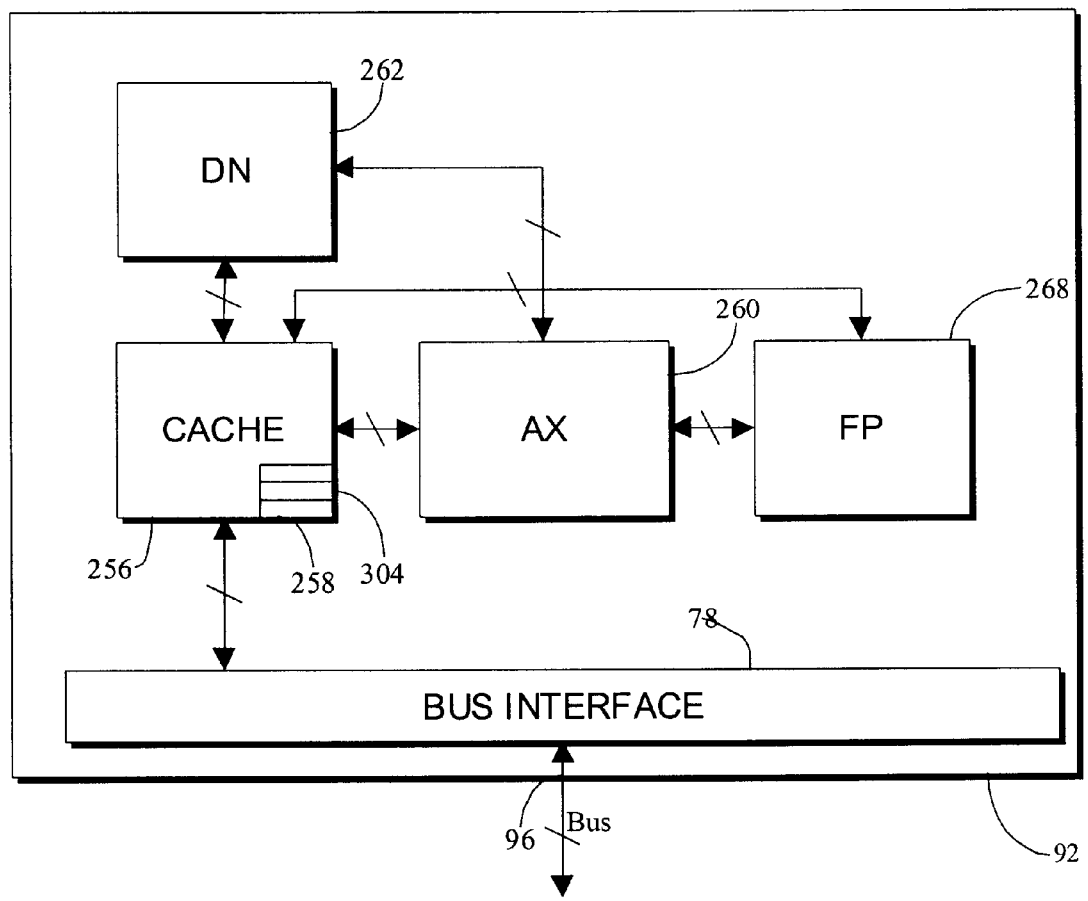
FIG. 4 is a block diagram of a processor shown in FIG. 3.

FIG. 4 is a block diagram of a processor 92 shown in FIG. 3. The processor 92 communicates with the bus 96 utilizing a bus interface 78. The bus interface is bidirectionally coupled to a unified local level 1 (L1) cache 256. Cache memories, such as this unified local (L1) cache 256, are typically constructed as high speed Static Random Access Memories (SRAM). In the preferred embodiment, the local (L1) cache 256 is incorporated on the same integrated circuit as the remainder of the processor 92. The local (L1) cache 256 is the primary block that interfaces with the bus interface 78. Data and instructions are loaded via the bus 96 into the local (L1) cache 256, and data is written back from the local cache 256 via the bus 96. Within the local (L1) cache 256 is shown a Safe Store Stack 258. Note that each program executing in a multi-programming environment has its own Safe Store Stack 258.

Figure 12:
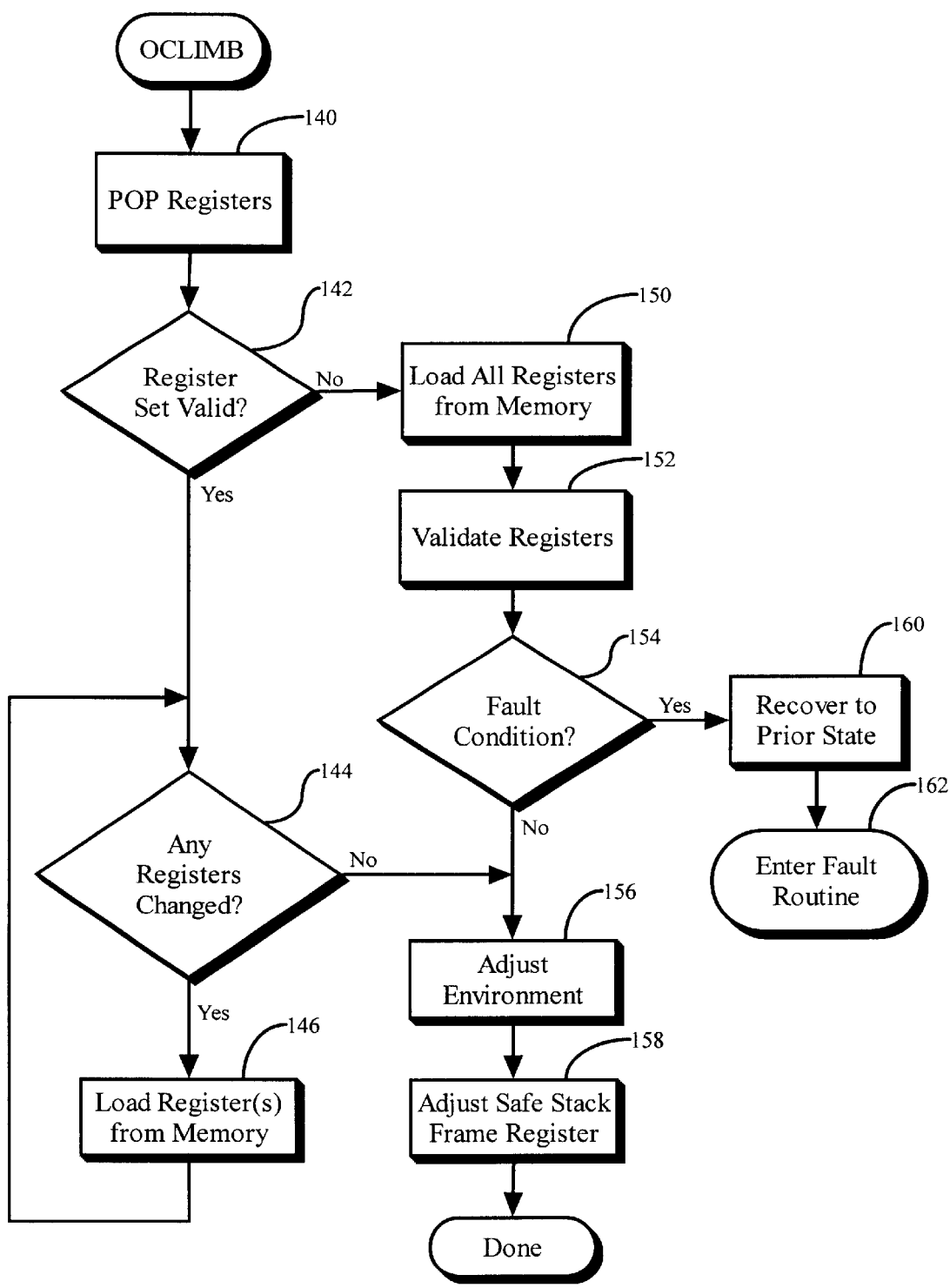
FIG. 12 is a flowchart illustrating operation of an OCLIMB instruction, in accordance with a preferred embodiment of the present invention.

The safe store stack (SSS) 258 typically contains a number of Safe Store Stack Frames 304. It should be noted that though the Safe Store Stack 258 is shown located in the local (L1) cache 256, typically less recently used portions of the Safe Store Stack 258 that include less recently used Safe Store Stack Frames 304 are pushed out to either the shared (L2) cache 94, or to slower memory 84 to make room for more current data in the local (L1) cache 256. The Safe Store Stack Frames 304 contain environmental data, such as register contents, necessary to restore previous processor contexts. The layout of Safe Store Stack Frames 304 in the preferred embodiment is shown in FIG. 12. The Safe Store Stack Frames 304 are stacked in the Safe Store Stack 258 as programs transition to ever more privileged contexts, and unstacked as the programs return from the more privileged contexts to less privileged contexts.

The local (L1) cache 256 is bidirectionally coupled to an AX module 260. The AX unit 260 provides the bulk of the functionality of the processor 92, including instruction decode. The AX unit 260 is bidirectionally coupled to and controls execution of a floating point (FP) unit 268 and a decimal/numeric (DN) unit 262. In the preferred embodiment, the floating-point unit 268 performs both floating-point operations and fixed-point multiplications and divisions. It is bidirectionally coupled to the local (L1) cache 256. The decimal/numeric (DN) unit 262 performs decimal and string operations. It is bidirectionally coupled to the local (L1) cache 256, allowing it to operate relatively autonomously from the AX unit 260. Rather, once decimal or string operations are initiated in the DN unit 262, the DN unit 262 is driven by operand availability in the local (L1) cache 256.

Figure 5:
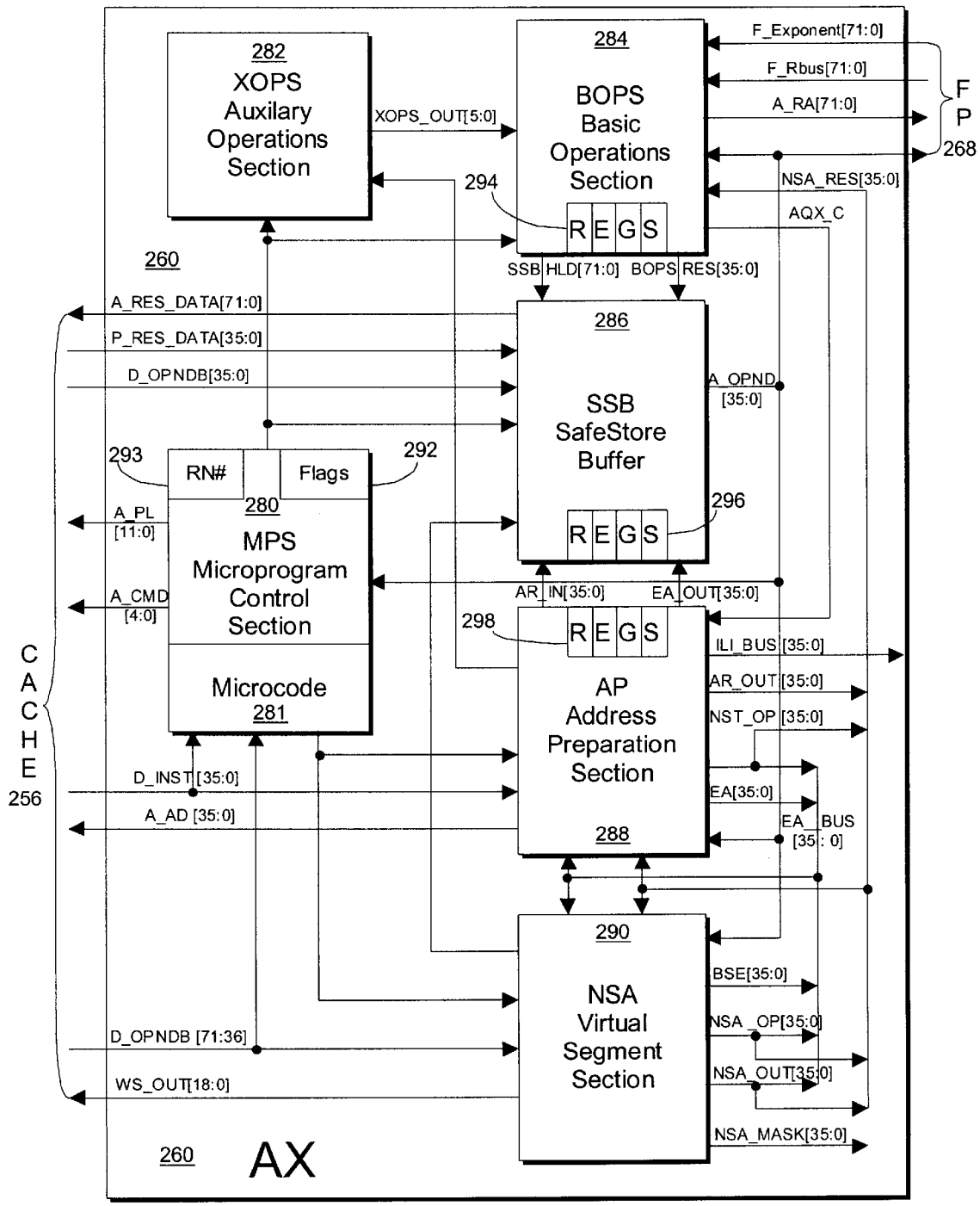
FIG. 5 is a block diagram illustrating an AX unit in the processor shown in FIG. 4.

FIG. 5 is a block diagram of an AX unit 260 in the processor 92 shown in FIG. 4. The AX unit 260 comprises a Microprogram Control Section (MPS) unit 280, an Auxiliary Operations Section (XOPS) 282, a Basic Operations Section (BOPS) 284, a Safe Store Buffer (SSB) 286, an Address Preparation (AP) section 288, and a NSA Virtual Segment Section 290. The MPS 280 is bidirectionally coupled to and receives instructions from the local (L1) cache 256. The MPS 280 performs instruction decode and provides microprogram control of the processor 92. The microprogram control utilizes a microengine executing microcode 281 stored in both dynamic and static memories in response to the execution of program instructions. The MPS 280 is bidirectionally coupled to and controls operation of the Auxiliary Operations Section (XOPS) 282, the Basic Operations Section (BOPS) 284, the floating point (FP) unit 268, the decimal/numeric (DN) unit 262, the Address Preparation (AP) section 288, and the NSA Virtual Segment Section 290. The Basic Operations Section (BOPS) 284 is used to perform fixed point arithmetic, logical, and shift operations. The Auxiliary Operations Section (XOPS) 282 performs most other operations. The Address Preparation (AP) section 288 forms effective memory addresses utilizing virtual memory address translations. The NSA Virtual Segment Section 290 is bidirectionally coupled to and operates in conjunction with the AP section 288, in order to detect addressing violations.

The Safe Store Buffer (SSB) 286 maintains the current status of the processor 92 environment, including user and segment registers. One purpose of the SSB 286 is to expedite changing processor state. Safe Store Stack Frames 304 containing context information, including register contents, are pushed from the Safe Store Buffer (SSB) 286 into memory when making context switches to higher privileged environments. In the prior art, the Safe Store Buffer (SSB) 286 is reloaded from Safe Store Stack Frames 304 stored in memory when making context switches back to lower privileged environments. Such context switches can be done under program control, or in response to internal or external interrupts. The SSB 286 is coupled to and receives signals from the BOPS 284, the AP section 288, the MPS 280, and the NSA 290. The SSB 286 receives register 294, 298 update information from these elements 280, 284, 288, 290, allowing the SSB 286 to maintain an accurate copy of all registers 294, 298 in the processor 92, and provides current register 294, 298 contents back to these elements 280, 284, 288, 290, upon demand. In the preferred embodiment, register update information is registered in the SSB 286 one half cycle after being registered in these other elements 280, 284, 288, 290. The SSB 286 is bidirectionally coupled to the local (L1) cache 256, allowing Safe Store Stack Frames 304 to be pushed out to local (L1) cache 256 when entering a new processor environment, and pulled back from local (L1) cache 256 when returning to an old processor environment.

The Basic Operations Section (BOPS) 284 contains arithmetic and logical registers 294. The Address Preparation (AP) section 288 contains address translation registers 298. These address translation registers 298 are also utilized by the NSA Virtual Segment Section 290.

In this FIG. 5, four copies or versions of the registers 294, 298, and the safe store copy of those register 296 are shown. Other numbers of sets of registers are within the scope of this invention. Whenever an ICLIMB or an OCLIMB instruction is executed, a different set of registers 294, 296, 298 is selected as the current register set. While in this computing environment, until the next ICLIMB or OCLIMB instruction is executed, each register reference references one of the registers 294, 298 in the currently selected set of registers, and copies of those registers 294, 298, are maintained in a corresponding Safe Store Buffer 286 set of shadow registers 296. In the preferred embodiment, the registers 294, 296, 298, are maintained in a round-robin system. A register set number 293 register provides an index for identifying the current set of registers 294, 296, 298. If four register sets are numbered 0, 1, 2, and 3, then subsequent ICLIMBs without intervening OCLIMBs would utilize register sets 0, 1, 2, 3, 0, 1, 2, 3, etc. Similarly, successive OCLIMBS would utilize register sets 3, 2, 1, 0, 3, 2, 1, 0, etc. This is efficiently implemented utilizing a two-bit incrementer/decrementer. This current register set number register 293 containing the current register set number (0 through 3 here) is then utilized to select registers from the current set of registers whenever registers are referenced during program execution.

The present invention also utilizes a number of flags 292 preferably accessible in the Microprogram Control Section 280 to efficiently implement register set rotation during execution of ICLIMB and OCLIMB instructions. Included in the flags 292 are Safe Store Stack Frame valid latches 314, 324 shown in FIGS. 6 and 7.

Figure 6:
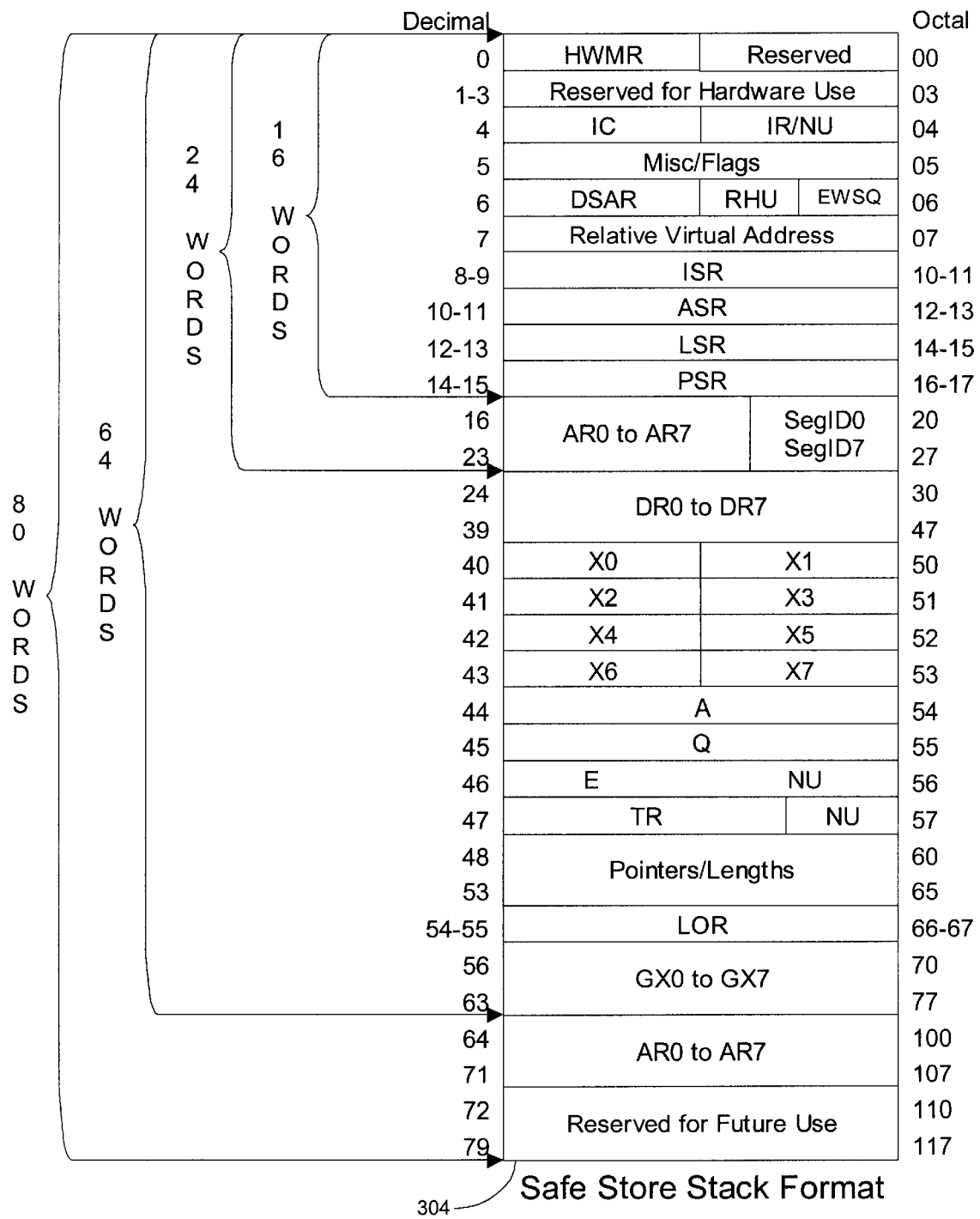
FIG. 6 is a diagram illustrating a Safe Store Buffer (SSB), in accordance with a preferred embodiment of the present invention.

FIG. 6 is a diagram illustrating the format of a Safe Store Stack (SSS) Frame 304, in accordance with a preferred embodiment of the present invention. As noted above, the ICLIMB instruction selectively lays down either a 16, 24, 64, or 80 word SSS stack frame 304.

Table T-1 contains the register names and mnemonics for the registers supported by a GCOS® 8 processor. The first column ("Register Name") contains the name of the register. The second column ("ID") contains a register ID or mnemonic. The third column ("Size") contains the size of the register in bits. The fourth column ("#") contains the number of that type of register. The fifth and sixth columns ("SSSF") contains the starting and ending decimal offsets for the register in the Safe Store Stack Frame 304 shown in FIG. 12. The registers marked with "*" in these columns indicate registers not saved in the SSSF 304.

TABLE T-1

Processor Accessible Registers

| Register Name | ID | Size | # | SSSF | |
|---|---|---|---|---|---|
| Data Stack Descriptor Registers | DSDR | 72 | 1 | * | * |
| Option Register | OR | 3 | 1 | * | * |
| Page Directory Base Register | PDBR | 19 | 1 | * | * |
| Pointer Registers | PRn | 108 | 8 | * | * |
| Safe Store Stack Register | SSR | 72 | 1 | * | * |
| High Water Mark Register | HWMR | 18 | 1 | 0 | 0 |
| Interrupt Mask Register | IMR | 36 | 1 | 0 | 0 |
| Fault Register | FR | 72 | 1 | 1 | 3 |
| Instruction Counter | IC | 18/34 | 1 | 4 | 4 |
| Indicator Register | IR | 18 | 1 | 4 | 4 |
| Stack Control Register | SCR | 2 | 1 | 5 | 5 |
| Instruction Segment Identity | SEGID | 12 | 1 | 5 | 5 |
| Data Stack Address Register | DSAR | 17 | 1 | 6 | 6 |
| Instruction Segment Register | ISR | 72 | 1 | 8 | 9 |
| Argument Stack Register | ASR | 72 | 1 | 10 | 11 |
| Linkage Segment Register | LSR | 72 | 1 | 12 | 13 |
| Parameter Segment Register | PSR | 72 | 1 | 14 | 15 |
| Segment Descriptor Registers | SEGIDn | 12 | 8 | 16 | 23 |
| Segment Descriptor Registers | DRn | 72 | 8 | 24 | 39 |
| Index Registers | Xn | 18 | 8 | 40 | 43 |
| Accumulator Register | A | 36 | 1 | 44 | 44 |
| Accumulator-Quotient Register | AQ | 72 | 1 | 44 | 45 |
| Exponent-Accumulator-Quotient | EAQ | 80 | 1 | 44 | 46 |
| Quotient Register | Q | 36 | 1 | 45 | 45 |
| Exponent Register | E | 8 | 1 | 46 | 46 |
| Timer Register | TR | 27 | 1 | 47 | 47 |
| Low Operand Register | LOR | 72 | 1 | 54 | 55 |
| General Index Registers | GXn | 36 | 8 | 56 | 63 |
| Address Registers | ARn | 24/36 | 8 | 64 | 71 |

Figure 7:
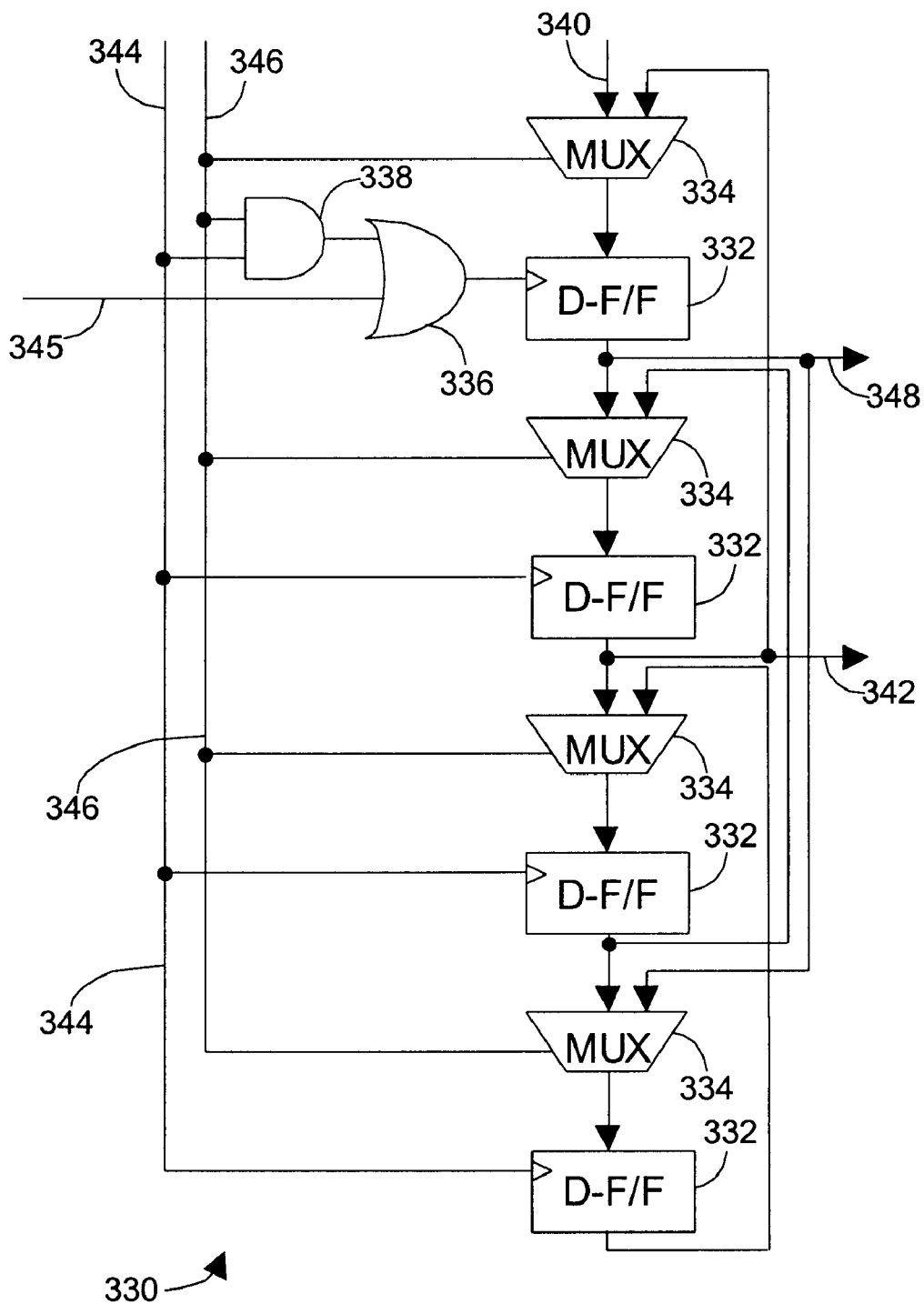
FIG. 7 is a block diagram illustrating the circuitry of a register bit cell, in accordance with a preferred embodiment of the present invention.

FIG. 7 is a block diagram illustrating the circuitry of a register bit cell, in accordance with a preferred embodiment of the present invention. The register bit cell 330 is replicated for each bit of each register in the AX unit 260. The register bit cell 330 contains four copies of a register bit. Each of the four copies is retained in a D flip/flop 332. Other numbers of register bits in such a register bit cell 330 are also within the scope of this invention. The register bit cell 330 can be viewed as a stack of D flip/flops 332 separated by 2×1 MUXes 334. Coupled to, and providing the primary (D) input to each D flip/flop 332 is a 2×1 MUX 334. Each D flip/flop 332, except the last, is coupled to, and provides a first input to, the MUX 334 below it. The first input to the first MUX 334 is provided externally as a register write signal 340. Each D flip/flop 332, except the first, is coupled to, and provides the second input to the MUX 334 feeding the D flip/flop 332 right above it. The output of the first D flip/flop 332 provides a register read signal 348. The output of the first D flip/flop 332 provides the second input to the last MUX 334. Thus, when the register bits are popped, the previous contents of the first D flip/flop 332 are registered in the last D flip/flop 332. This register stack wrap-around feature is utilized in FIG. 12 to perform fault recovery. In that case, four successive POPs of the register stack gets back to the original set of registers. The output of the second D flip/flop 332 is provided as a delayed memory write signal 342. This delayed memory write signal 342 is utilized by the background/delayed register write function (see steps 112 and 114 in FIG. 11).

Selection of one of two inputs for each of the 2×1 MUXes 334 is controlled by a register input select signal 346. Each of the D flip/flops 332 is triggered by a clock signal. The clock signal for all except the first D flip/flop 332 is provided by a register push/pop signal 334. The clock signal for the first D flip/flop 332 is the output of an OR gate 336. The first input to the OR gate 336 is the output of an AND gate 338 having two inputs. The first input of the AND gate 338 is the register push/pop signal 344. The second input to the AND gate 338 is the register input select line 346. The second input to the OR gate 336 is a register write enable signal 345. Thus, the first D flip/flop 332 registers the value of the register write signal 340 when the register write enable signal 345 is asserted, and the output from the second D flip/flop 332 when both the register input select line 346 and the push/pop signal 344 are asserted at the same time, indicating a register POP. The contents of the first D flip/flop 332 remain unchanged during a register push, when the register input select line 346 is negated when the push/pop signal 344 is asserted. This provides the default initial value for the new register state until and unless changed.

During normal operation, register contents are written to the first D flip/flop by providing a register value on the register write line 340, negating the register input select line 346 to select the first input to the first MUX 334, and by asserting the register write enable signal 345. The output from the register is provided by the first D flip/flop on the register read line 348. The output from the second D flip/flop 332 provides a delayed memory write signal 342. PUSHing registers is accomplished by providing an initial register value on the register write line 340, again selecting the first input to the first MUX 334 by negating the register input select line 346, and by asserting the register push/pop signal 344. Negating the register input select line 346 disables updating the first D flip/flop 332. The previous contents of the first D flip/flop 332 are pushed down to the second D flip/flop 332. This continues until the contents of the last D flip/flop 332 are pushed out of the register cell 330 and provided on the register stack output signal 341.

Popping registers is accomplished by providing an initial register value on the default or invalid signal 342, this time selecting the second input to each MUX 334 by asserting the register input select line 346, and by asserting the register push/pop signal 344. The contents of the first D flip/flop 332 are registered in the last D flip/flop 332. The previous contents of the last D flip/flop 332 are pushed up to the second-to-last D flip/flop 332. This continues until the contents of the second D flip/flop 332 are pushed into the first D flip/flop 332. As noted above, this register bit wraparound is utilized in FIG. 12 to perform fault recover when invalid register contents are detected.

It should be noted that this FIG. utilizes D flip/flops 332 and 2×1 MUXes 334. This is for illustrative purposes only. The present invention includes other implementations with similar or equivalent functionality.

Figure 8:
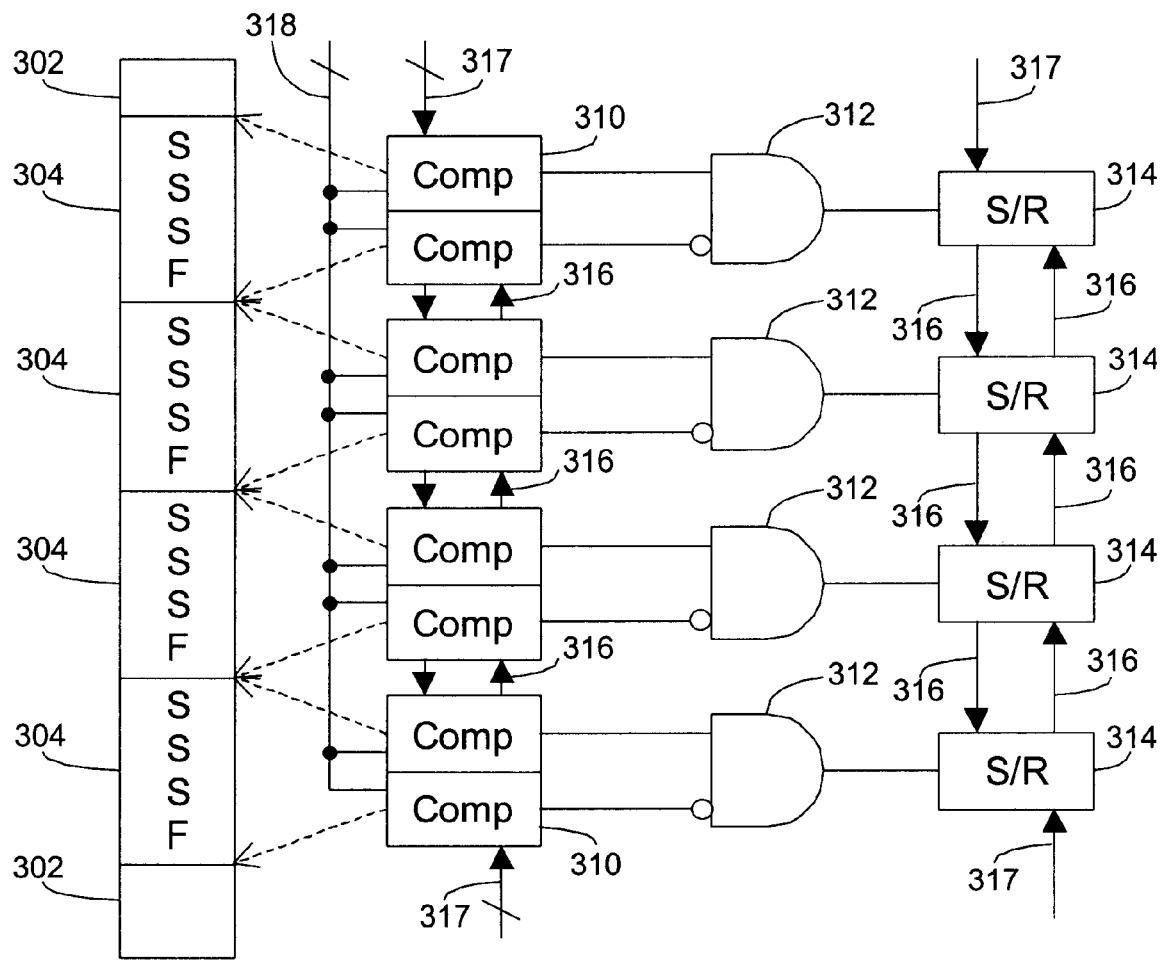
FIG. 8 is a block diagram illustrating circuitry to invalidate a register set, in accordance with a preferred embodiment of the present invention.

FIG. 8 is a block diagram illustrating circuitry to invalidate a register set, in accordance with a preferred embodiment of the present invention. A Safe Store Stack 302 is stored in a memory 24 and typically contains a plurality of Safe Store Stack Frames (SSSF) 304. A Safe Store Stack 302 is described by a Safe Store Register (SSR) (see Table T-1 above). When created, each Safe Store Stack Frame (SSSF) 304 will typically start in cache memory 256, 94, but may be pushed out to main memory 84 if necessary to make room for more current data in the cache memories 256, 94. In this FIG., four Safe Store Stack Frames (SSSF) 304 are shown, corresponding to the four sets of registers 294, 296, 298. Four pairs of two comparators 310 are utilized to point at the five frame boundaries for the four Safe Store Stack Frames (SSSF) 304. Each pair of comparators 310 points at the first and last of a Safe Store Stack Frame (SSSF) 304.

Whenever memory 24 is written, each of the comparators 310 compares its compare address to the write address 318. If the write address 318 is greater than the compare address, the resulting signal is in a first state (such as true), while if the write address is 318 less than the compare address, the resulting signal is in a second state (such as false). The outputs of pairs of comparators 310 are inputs to two-input AND gates 312, with one of the inputs to each two-input AND gates 312 being negated. Thus, the outputs of each of the four two-input AND gates 312 correspond to whether or not the write address 318 is within the corresponding Safe Store Stack Frame (SSSF) 304. Whenever the write address is detected to fall within one of the Safe Store Stack Frames (SSSF) 304, this result is latched 314. In this FIG., four S/R latches 314 are shown, with the output of the two-input AND gates 312 coupled to the R (Reset) input of the S/R latches 314. Thus, whenever a write address 318 falls within a Safe Store Stack Frame (SSSF) 304, the corresponding S/R latch is cleared (or reset), indicating that the corresponding register(s) 294, 296, 298 no longer contain the same values as the corresponding Safe Store Stack Frame (SSSF) 304. Whenever this happens, the registers 294, 296, 298 need to be restored from the Safe Store Stack Frame (SSSF) 304 in response to execution of an OCLIMB instruction. Otherwise, the previous environment can be efficiently restored by selecting the appropriate set of registers 294, 296, 298 to be the current register set.

Each of the bits for each of the compare registers for each of the comparators 310, for each of the registers 294, 296, 298, and for the valid flag 314 are implemented utilizing the register bit cell 330 shown in FIG. 7. Register contents are simultaneously pushed for all of the registers 294, 296, 298, comparators 310, and valid flags 314 by negating the register input select line 346, and by asserting the register push/pop signal 344. Similarly, Register contents are simultaneously popped for all of the registers 294, 296, 298, comparators 310, and valid flags 314 by asserting the register input select line 346, and by asserting the register push/pop signal 344. The valid flag 314 for the first register set will typically be initialized as true when registers are pushed onto the stack, whereas the valid flag for the last register set will typically be initialized to false when registers are popped.

Figure 9:
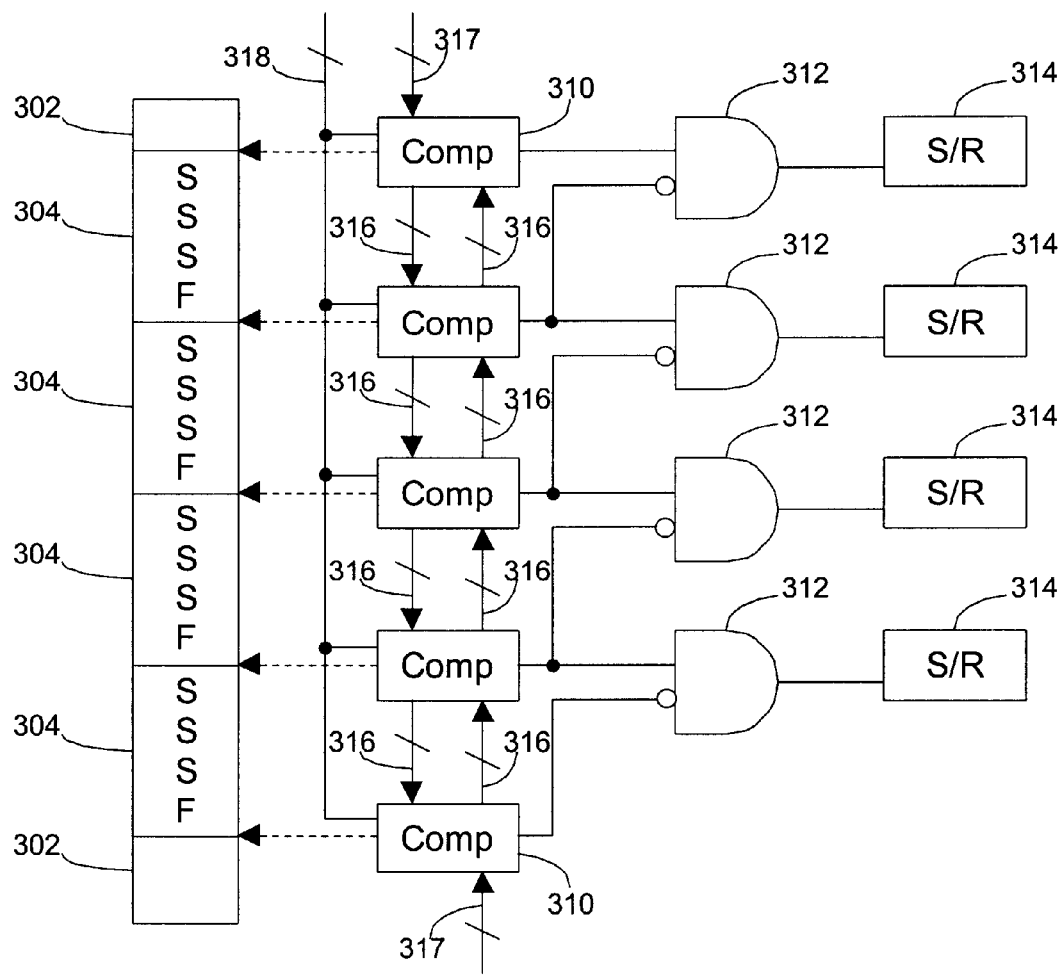
FIG. 9 is a block diagram illustrating circuitry to invalidate a register set, in accordance with an alternate embodiment of the present invention.

FIG. 9 is a block diagram illustrating circuitry to invalidate a register set, in accordance with an alternate embodiment of the present invention. A Safe Store Stack 302 is stored in a memory 24 and typically contains a plurality of Safe Store Stack Frames (SSSF) 304. A Safe Store Stack 302 is described by a Safe Store Register (SSR) (see Table T-1 above). When created, each Safe Store Stack Frame (SSSF) 304 will typically start in cache memory 256, 94, but may be pushed out to main memory 84 if necessary to make room for more current data in the cache memories 256, 94. In this FIG., four Safe Store Stack Frames (SSSF) 304 are shown, corresponding to the four sets of registers 294, 296, 298. Five comparators 310 are utilized to point at the five frame boundaries for the four Safe Store Stack Frames (SSSF) 304. The middle three comparators 310 are utilized to point at the start of one Safe Store Stack Frame (SSSF) 304 and the end of the next.

Whenever memory 24 is written, each of the comparators 310 compares its compare address to the write address 318. If the write address 318 is greater than the compare address, the resulting signal is in a first state (such as true), while if the write address is 318 less than the compare address, the resulting signal is in a second state (such as false). The outputs of pairs of comparators 310 are inputs to two-input AND gates 312, with one of the inputs to each two-input AND gates 312 being negated. Thus, the outputs of each of the four two-input AND gates 312 correspond to whether or not the write address 318 is within the corresponding Safe Store Stack Frame (SSSF) 304. Whenever the write address is detected to fall within one of the Safe Store Stack Frames (SSSF) 304, this result is latched 314. In this FIG., four S/R latches 314 are shown, with the output of the two-input AND gates 312 coupled to the R (Reset) input of the S/R latches 314. Thus, whenever a write address 318 falls within a Safe Store Stack Frame (SSSF) 304, the corresponding S/R latch is cleared (or reset), indicating that the corresponding register(s) 294, 296, 298 no longer contain the same values as the corresponding Safe Store Stack Frame (SSSF) 304. Whenever this happens, the registers 294, 296, 298 need to be restored from the Safe Store Stack Frame (SSSF) 304 in response to execution of an OCLIMB instruction. Otherwise, the previous environment can be efficiently restored by selecting the appropriate set of registers 294, 296, 298 to be the current register set.

The five comparators 310 are shown coupled together 316 as a two-way stack. This allows Safe Store Stack Frame (SSSF) 304 limits to be loaded 317 into a first comparator 310 during an ICLIMB instruction, then pushed into subsequent comparators 310 as subsequent ICLIMBS are executed. Similarly, the comparator 310 addresses are pushed in the other direction in response to OCLIMB instructions.

Figure 10:
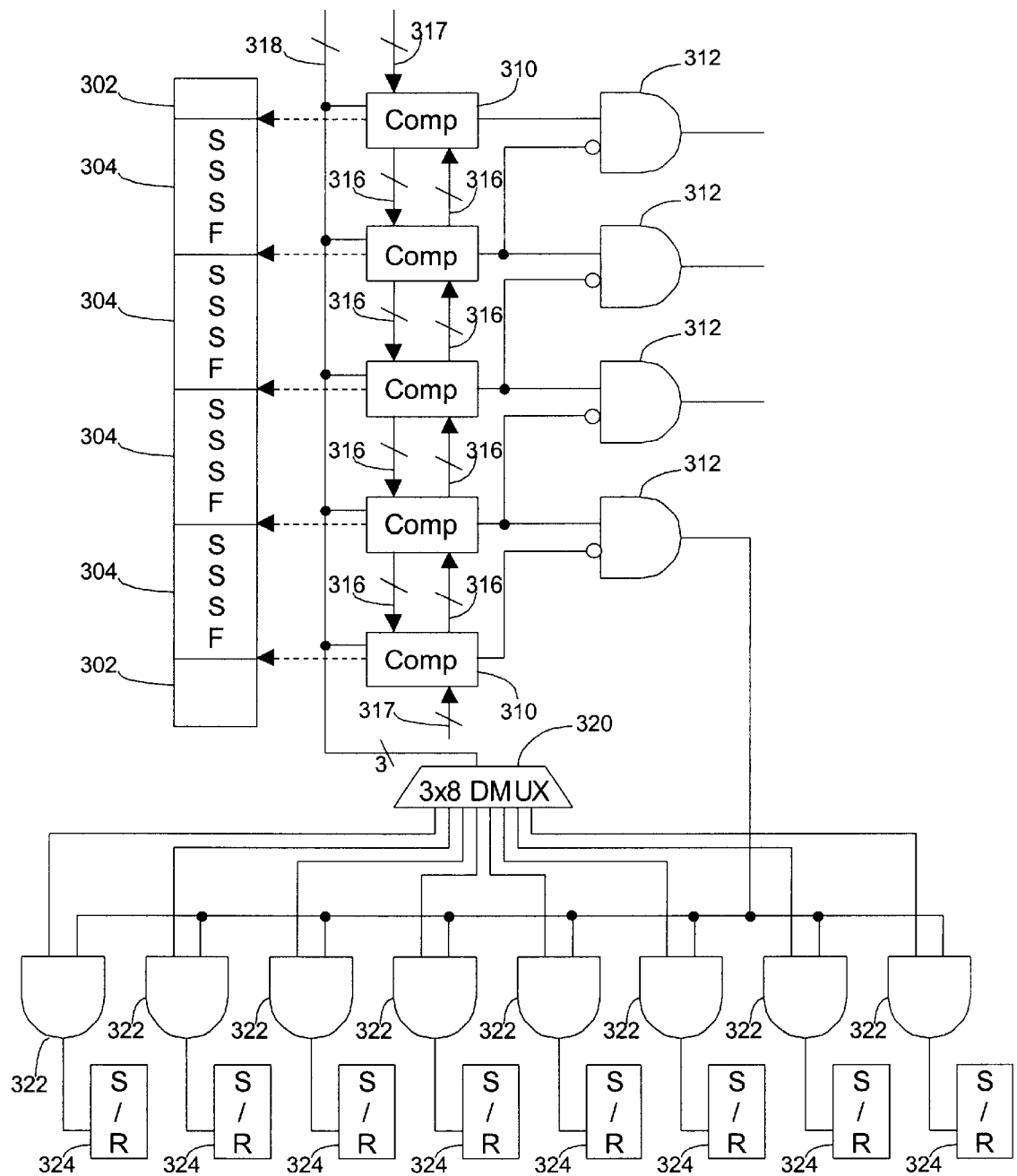
FIG. 10 is a block diagram illustrating circuitry to invalidate a register subset, in accordance with an alternate embodiment of the present invention.

FIG. 10 is a block diagram illustrating circuitry to invalidate a register subset, in accordance with an alternate embodiment of the present invention. As with FIG. 9, five comparators 310 are utilized to identify writes to one of four Safe Store Stack Frames 304. Again, as in FIG. 9, each logically adjacent pair of comparators 310 provides the two inputs to a first AND gate 312 (with one input inverted). The output from the first AND gate 312 will be asserted whenever a write is detected to the corresponding Safe Store Stack Frame 304. In this FIG., a write address bus 318 is shown. The write address bus 318 provides the write address for comparison by the comparators 310. In this embodiment, the bottom three write address bits are ignored by the comparators 310 since Safe Store Stack Frames 304 are all a multiple of eight ($2^3$). The bottom three write address lines 318 are demultiplexed by a 3×8 DMUX 320. The eight outputs of the 3×8 DMUX 320 each provide one input to a second set of AND gates 322. The second input to each of these second set of AND gates 322 is the output of one of the first set of AND gates 312. Thus, the output of one of the second set of AND gates 322 will be asserted if the high order write address lines 318 indicate a write to the corresponding Safe Store Stack Frame 304, and the low order write address lines 318 indicate a write to a particular set of words in the Safe Store Stack Frame 304. The output of each of the second set of AND gates 322 is latched 324, indicating that the corresponding set of Safe Store Stack Frame 304 words has been written, and thus no longer corresponds to its corresponding registers 294, 296, 298. In the case of a 16-word Safe Store Stack Frame 304, each latch 324 corresponds to two Safe Store Stack Frame 304 words. Similarly, for each 24-word Safe Store Stack Frame 304, each latch 324 corresponds to three Safe Store Stack Frame 304 words. Only those registers 294, 296, 298 corresponding to cleared latches 324 need to be restored from the Safe Store Stack Frame 304 in response to execution of an OCLIMB instruction.

In the preferred embodiment, the three low-order write address lines 318 were demultiplexed 320. This eight-way address discrimination corresponds well to the Safe Store Stack Frame 304 sizes supported by the GCOS 8 architecture. However, other configurations are also within the scope of this invention. For example, the low-order two write address lines may be ignored, resulting in a contiguous granularity of four words, instead of one word. A 3×8 DMUX 320 would thus cover blocks of 32 words. This configuration may prove advantageous in some situations since four words can be fetched efficiently as a single cache-line. Similarly, other sizes of DMUXes 320 are also within the scope of this invention.

In an alternate embodiment, determination whether or not a given Safe Store Stack Frame 304 has been modified, and thus no longer contains the same values as its corresponding set of registers 294, 296, 298 is performed in the cache memory 256, 94. Cache entries containing Safe Store Stack Frames 304 are marked or colored to indicate this. Then, whenever the memory containing a Safe Store Stack Frame 304 is modified, the modification is noted and utilized when executing OCLIMB instructions to determine whether it is necessary to reload the (now) current register set 294, 296, 298 from the corresponding Safe Store Stack Frame 304.

Figure 11:
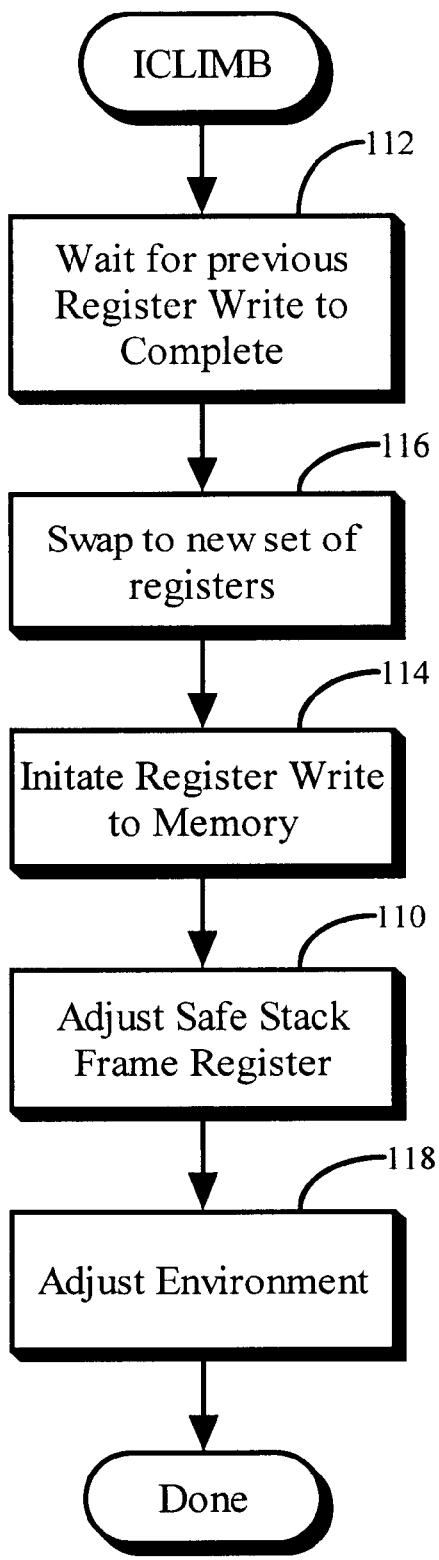
FIG. 11 is a flowchart illustrating operation of an ICLIMB instruction, in accordance with a preferred embodiment of the present invention.

FIG. 11 is a flowchart illustrating operation of an ICLIMB instruction, in accordance with a preferred embodiment of the present invention. The ICLIMB instruction is typically utilized to transfer control from a lower security environment, such as a user program, to a higher security environment, such as the operating system. This is the method typically utilized to request system services. Interrupts are serviced by a special variant of the ICLIMB instruction. As noted below, the OCLIMB instruction is typically utilized to return from the ICLIMB instruction or from system interrupts. In the preferred embodiment, the ICLIMB instruction will selectively lay down a Safe Store Stack Frame (SSSF) 304 of 16, 24, 64, or 80 words. The format of a Safe Store Stack Frame (SSSF) 304 is shown in FIG. 6.

The ICLIMB instruction starts by waiting for completion of a previous ICLIMB register write to complete, if necessary, step 112. A new register set 294, 296, 298, and Safe Store Buffer (SSB) 286 are selected as the current register set 294, 296, 298, and Safe Store Buffer (SSB) 286, step 116. In the preferred embodiment, this is done by PUSHing the registers in the register stack (see FIG. 7 for more details). In an alternate embodiment, this is done by utilizing a Register Set Number 293 register (see FIG. 5) to designate the current register set and Safe Store Buffer. If there are four different sets of registers and Safe Store Buffers, then a two-bit Register Set Number register 293 can be utilized. The Register Set Number register 293 is incremented by one, with MOD 4 truncation. The Register Set Number register 293 will typically be used to selectively enable one of the sets of registers 294, 296, 298, and one Safe Store Buffer (SSB) 286. At this time also, the newly selected registers 294, 296, 298 are marked as valid, for example by setting the appropriate S/R latches 314, 324.

Next, a register write to the Safe Store Stack Frame (SSSF) 304 in memory is initiated, step 114. The register write will continue in the background, utilizing spare write cycles to write the registers to memory. The Safe Store Register (SSR) is adjusted to address a new Safe Store Stack Frame (SSSF) 304, step 110. The ICLIMB instruction causes certain environmental registers to be modified. Finally, the remainder of the environment is appropriately modified and control is transferred to the designated location in the new environment, step 118.

FIG. 12 is a flowchart illustrating operation of an OCLIMB instruction, in accordance with a preferred embodiment of the present invention. The OCLIMB instruction is utilized to transfer control from a higher security or more privileged environment, such as the operating system, to a lower security or lesser-privileged environment, such as a user program. It is primarily utilized to return from a previous call to ICLIMB (see FIG. 11) or from servicing interrupts. One of its primary purposes is to restore registers to the state they were in before the corresponding ICLIMB instruction was executed.

The OCLIMB starts by POPping registers, step 140. This process is shown in more detail in FIG. 7. A test is then made whether the register set is valid, step 142. The register set will be shown as invalid either because: 1) more register pops were performed than register pushes; 2) more register pops were performed than could be saved in the register stack/queue; or 3) some or all of the corresponding safe store stack frame 304 was overwritten in memory. If the register set just popped is marked as valid, step 142, registers are sequentially tested to see if their contents have changed in memory, step 144. If register contents have been modified in the corresponding safe store stack frame 304, the register is reloaded from the safe store stack frame 304 in memory, step 146. This step is repeated for each changed register. Upon completion of that loop, the environment is adjusted, step 156, the safe store stack frame register is adjusted to point at the previous stack frame, step 158, and the OCLIMB exits, transferring control to the specified return address.

Figure 13:
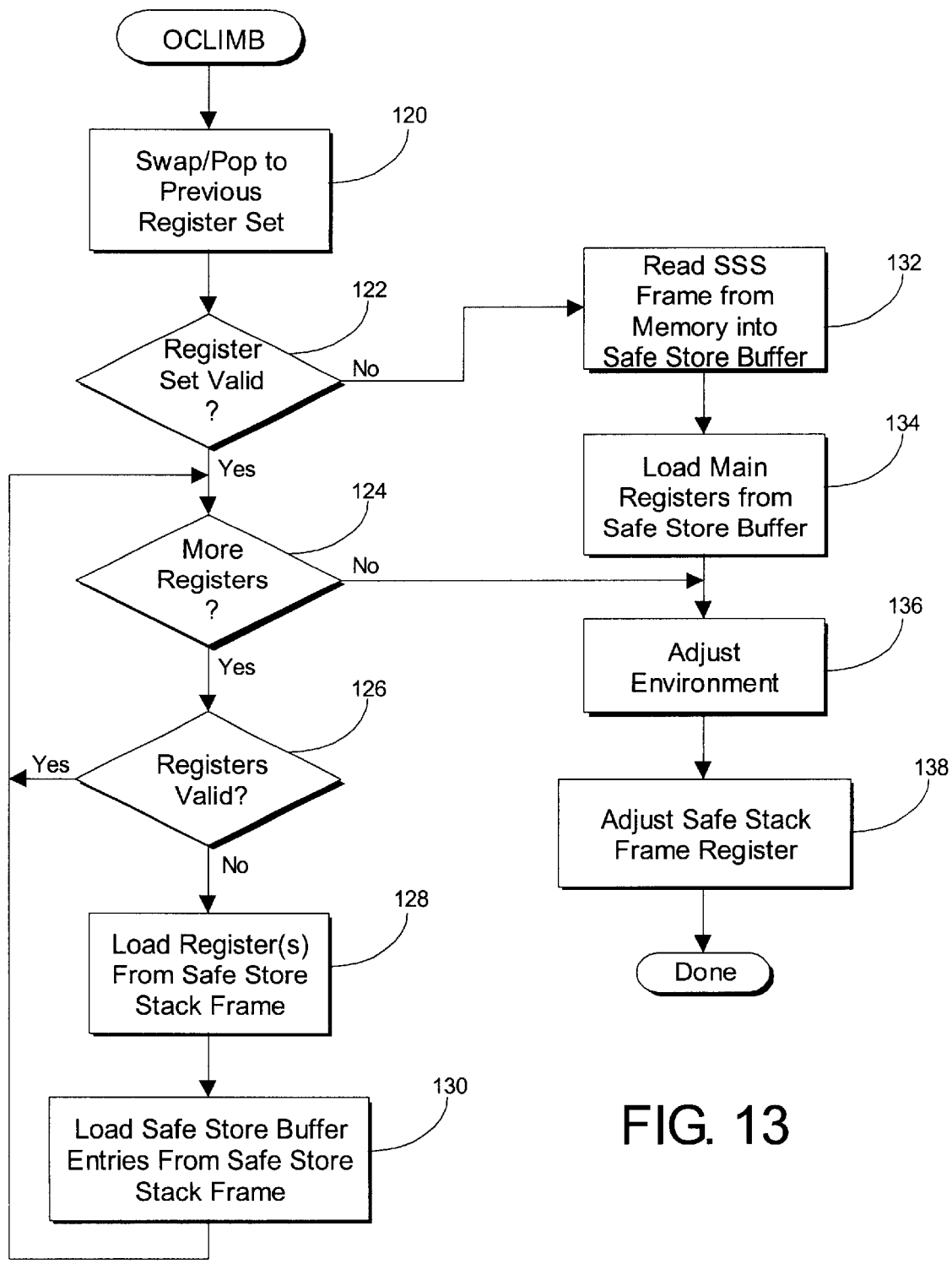
FIG. 13 is a flowchart illustrating operation of an OCLIMB instruction, in accordance with an alternate embodiment of the present invention.

If the register set was marked as invalid, step 142, the registers are all loaded from the corresponding safe store stack frame 304 in memory, step 150. The registers are then validated, step 152. This is primarily a security precaution to prevent invalid values being loaded in control registers. A test is made whether there is a fault condition, step 154. This tests whether any of the register contents were determined to be invalid in step 152. If a fault condition was not detected, step 154, the environment is adjusted, step 156, the safe store stack frame register is adjusted to point at the previous stack frame, step 158, and the OCLIMB exits. Otherwise, if a fault condition was detected, step 158, recovery is made to a prior, known, state, step 160, and a fault routine is entered, step 162. In this preferred embodiment, the prior register set is recovered by performing three successive POPs of the register stack, bringing back the register set active at the time of the OCLIMB. FIG. 13 is a flowchart illustrating operation of an OCLIMB instruction, in accordance with an alternate embodiment of the present invention. The OCLIMB starts by switching or popping to a previous set of registers 294, 296, 298 and Safe Store Buffer (SSB) 286, step 120. If a two-bit Register Set Number register 293 is utilized to designate and enable one of four sets of registers 294, 296, 298, and one Safe Store Buffer (SSB) 286, then the Register Set Number register 293 selecting and enabling such can be decremented, utilizing MOD 4 arithmetic. Thus, register sets 294, 296, 298 are selected in the order of: 3, 2, 1, 0, 3, 2, 1, 0. . . . A test is then made whether this newly selected set of registers 294, 296, 298, and Safe Store Buffer (SSB) 286 is valid, step 122. For example, this can be done by testing the appropriate S/R latch 314 (see FIG. 9). If the set of registers 294, 296, 298, and Safe Store Buffer (SSB) 286 are valid, step 122, a loop is entered and a test is then made whether more registers need to be processed, step 124. If there are more registers to be processed, step 124, a test is made whether a given register is valid, step 126. For example, this can be done by testing the appropriate S/R latch 324 (see FIG. 10). If the register is not valid, step 126, the register is loaded from the Safe Store Stack Frame 304 in memory 24, step 128. The corresponding Safe Store Buffer entry is similarly loaded from the Safe Store Stack Frame 304. In either case, regardless of whether a given register is valid, step 126, the loop repeats, starting at the test for more registers, step 124.

Otherwise, when the register set is not valid, step 122, the corresponding Safe Store Stack Frame (SSSF) 304 is read from memory 24 into the Safe Store Buffer (SSB) 286, step 132. In the preferred embodiment, the memory is the internal (L1) cache 256. However, it may be necessary to load the Safe Store Stack Frame (SSSF) 304 from either the shared (L2) cache 94, or even a Memory Management Unit (MMU) 84. The registers 294, 296, 298 in the current set of registers are then loaded from either the Safe Store Stack Frame (SSSF) 304 or Safe Store Buffer (SSB) 286, step 134. In any case, regardless of whether the register set was valid, step 122, the system environment is adjusted as required, step 136, the Safe Store Stack register is adjusted to address the previous Safe Store Stack Frame (SSSF) 304, step 138, and the instruction terminates by transferring to the address located in the Instruction Counter (IC) register.

In the preferred embodiment, registers and/or register sets are invalidated as a result of snooping an address bus 318. This address bus 318 will typically contain all write addresses in the current system. This allows one processor to recognize writes by another processor to the Safe Store Stack Frame (SSSF) 304 corresponding to a given set of registers 294, 296, 298 and Safe Store Buffer (SSB) 286.

In an alternative embodiment, this functionality is provided by the cache memory system. In that embodiment, the local (L 1) cache 256 is marked to identify Safe Store Stack Frame (SSSF) 304. Whenever a write is made by that processor to a Safe Store Stack Frame (SSSF) 304, the cache line or block containing the portion of the Safe Store Stack Frame (SSSF) 304 modified is marked to indicate this. Writes by other processors to the Safe Store Stack Frame (SSSF) 304 cause the cache line or block being modified to be "siphoned" off to the modifying processor. This results in the cache line or block being invalidated in the original processor. This L1 cache 256 line invalidation would then result in the corresponding portion of the set of registers 294, 296, 298 being invalidated. In one embodiment, when a cache line or block containing a part of a Safe Store Stack Frame (SSSF) 304 is pushed out of the L1 cache 256, the corresponding registers 294, 296, 298 are invalidated. In an alternative embodiment, the cache lines or blocks containing the Safe Store Stack Frames (SSSF) 304 corresponding to the sets of registers 294, 296, 298 can be locked into the L1 cache 256 until either reused, or the Safe Store Stack Register (see Table T-1) is loaded to point at a different Safe Store Stack 302. This later typically indicates that control has been switched to another process or activity.

Execution of a context switch instruction, such as an OCLIMB instruction, can be greatly accelerated by utilizing a plurality of sets of registers 294, 296, 298. When a context switch is made to a higher security environment (such as by utilizing the ICLIMB instruction), a different set of registers 294, 296, 298 is selected and utilized. Then, when returning to the lower security environment (such as by utilizing the OCLIMB instruction), the old set of registers is reselected and utilized to the extent possible, without the necessity of loading the registers 294, 296, 298 from memory 84, 94, 256.

Those skilled in the art will recognize that modifications and variations can be made without departing from the spirit of the invention. Therefore, it is intended that this invention encompasses all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A method of restoring an execution environment in a data processing system when returning to the execution environment, wherein:

the execution environment is at least partially defined by a current register set;

said method comprising:

A) selecting a current register set from a set of register sets;

B) testing whether the current register is valid;

C) loading the current register from a stack frame in a memory when the current register set is tested as not valid in step (B);

D) validating the current register set when loaded from the memory in step (C); and E) testing whether the validating in step (D) was successful.

2. The method in claim 1 which further comprises:

F) testing whether a memory copy of a current one of the current register set has been modified when the current register set is tested as valid in step (B); and G) loading the current one of the current register set from the memory copy of the current one of the current register set when the memory copy is determined in step (D) to have been modified.

3. The method in claim 2 which further comprises:

H) repeating steps (F) and (G) as a loop with a second one of the current register set as the current one of the current register set.

4. The method in claim 1 which further comprises:

I) recovering to a prior execution state when the testing in step (E) determines that the validating in step (D) was not successful.

5. The method in claim 4 wherein step (I) comprises:
selecting a previous register set from the set of register sets as current register set.

6. The method in claim 5 wherein:
the selecting of the previous register set comprises:
popping a register set from the set of register sets until the previous register set is encountered.

7. The method in claim 4 which further comprises:
J) entering a fault routine after recovering to the prior execution state in step (F).

8. The method in claim 1 wherein:
the set of register sets is organized as a stack of register sets, and step (A) comprises:
popping the current register set from the stack of register sets.

9. The method in claim 1 wherein:
the set of register sets is addressed by a current register set designator, and
step (A) comprises:
adjusting the current register set designator to address the current register set.

10. The method in claim 1 which further comprises:
K) adjusting a stack frame pointer to address the current stack frame in the memory.

11. A method of establishing an execution environment in a data processing system when entering a new execution environment, wherein:
the execution environment is at least partially defined by a current register set;
said method comprising:
A) waiting for a write of a previous register set to complete;
B) setting the previous register set to a current register set when the waiting in step (A) is complete;
C) selecting the current register set from a set of register sets;
D) initiating a write of the previous register set to a previous stack frame in a memory after the previous register set is set to the current register set in step (B).

12. The method in claim 11 wherein:
the set of register sets is organized as a stack of register sets, and step (C) comprises:
pushing the current register set onto the stack of register sets.

13. The method in claim 11 wherein:
the set of register sets is addressed by a current register set designator, and
step (C) comprises:
adjusting the current register set designator to address the current register set.

14. The method in claim 11 which further comprises:
E) initializing at least one register in the current register set to a value of a corresponding one register in the previous register set.

15. The method in claim 11 which further comprises:
E) adjusting a stack frame pointer to address the current stack frame in the memory.

16. A processor capable of restoring an execution environment in a data processing system when returning to the execution environment, wherein:
the execution environment is at least partially defined by a current register set;
said processor comprises:
A) a set of register sets, wherein each of the set of register sets comprises a plurality of registers;
B) a memory;
C) means for selecting a current register set from a set of register sets;
D) means for testing whether the current register is valid;
E) means for loading the current register from a stack frame in the memory when the current register set is tested as not valid in means (D);
F) means for validating the current register set when loaded from the memory in step (C); and
G) means for testing whether the validating in step D) was successful.

17. The processor in claim 16 wherein:
the set of register sets is organized as a stack of register sets, and means (C) comprises:
means for popping the current register set from the stack of register sets.

18. The processor in claim 16 wherein:
the processor further comprises:
a current register set designator;
the set of register sets is addressed by the current register set designator; and
means (C) comprises:
means for adjusting the current register set designator to address the current register set.

* * * * *